United States Patent
Alger et al.

(10) Patent No.: US 10,226,982 B2
(45) Date of Patent: Mar. 12, 2019

(54) AUTOMATIC VEHICLE CLIMATE CONTROL BASED ON PREDICTED AIR QUALITY

(71) Applicant: International Business Machines Corporation, Armonk, NY (US)

(72) Inventors: Joshua A. Alger, Raleigh, NC (US); Alan R. Buss, Raleigh, NC (US); James D. Creasman, Apex, NC (US); Jeffrey R. Hoy, Southern Pines, NC (US)

(73) Assignee: International Business Machines Corporation, Armonk, NY (US)

( * ) Notice: Subject to any disclaimer, the term of this patent is extended or adjusted under 35 U.S.C. 154(b) by 984 days.

(21) Appl. No.: 14/699,223

(22) Filed: Apr. 29, 2015

(65) Prior Publication Data

US 2016/0318368 A1   Nov. 3, 2016

(51) Int. Cl.
*B60H 1/00* (2006.01)
*G08G 1/0967* (2006.01)
(Continued)

(52) U.S. Cl.
CPC ......... *B60H 1/00771* (2013.01); *B60H 1/008* (2013.01); *G01C 21/3453* (2013.01);
(Continued)

(58) Field of Classification Search
None
See application file for complete search history.

(56) References Cited

U.S. PATENT DOCUMENTS

| 4,763,564 A | * | 8/1988 | Czarnecki | B60H 1/008 454/139 |
| 5,377,528 A | * | 1/1995 | Dauvergne | B60H 1/00792 165/11.1 |

(Continued)

FOREIGN PATENT DOCUMENTS

| CA | 2123491 A1 | 4/1994 |
| WO | WO2011/145781 A1 | 11/2011 |

OTHER PUBLICATIONS

Amrita Amritphale,"A Digital Image Processing Method for Detecting Pollution in the Atmosphere From Camera Video", Master of Science in Computer Science, University of Nevada, Las Vegas (Year: 2013).*

(Continued)

*Primary Examiner* — Navid Ziaeianmehdizadeh
(74) *Attorney, Agent, or Firm* — Stephen J. Walder, Jr.; Jeffrey S. LaBaw

(57) ABSTRACT

Mechanisms are provided for controlling air quality within an interior of a vehicle. Air quality data is received from a vehicle mounted sensor of the vehicle, and at least one of a sensor of another vehicle, an external environment sensor, or a remotely located information source system. A first air quality measure is determined for an external environment exterior to the vehicle and a second air quality measure of an internal environment of the vehicle is determined based on the air quality data. At least one control signal to send to a climate control system of the vehicle is determined based on the determined first air quality measure and determined second air quality measure. Air quality within the internal environment of the vehicle is controlled by sending the at least one control signal to the climate control system.

21 Claims, 3 Drawing Sheets

(51) Int. Cl.
  *G06K 9/00* (2006.01)
  *G01C 21/34* (2006.01)
  *G06K 9/62* (2006.01)

(52) U.S. Cl.
  CPC ..... *G06K 9/00791* (2013.01); *G08G 1/09675* (2013.01); *G08G 1/096725* (2013.01); *G08G 1/096775* (2013.01); *G08G 1/096783* (2013.01); *G08G 1/096791* (2013.01); *G06K 9/6289* (2013.01)

(56) References Cited

U.S. PATENT DOCUMENTS

| | | | | |
|---|---|---|---|---|
| 5,486,138 | A * | 1/1996 | Sorensen | B60H 1/008 454/139 |
| 5,954,577 | A * | 9/1999 | Meckler | B60H 3/0625 454/75 |
| 5,980,378 | A * | 11/1999 | Wieszt | B60H 1/008 454/75 |
| 6,298,291 | B1 * | 10/2001 | Davis, Jr. | B60H 1/008 180/68.2 |
| 6,351,989 | B1 * | 3/2002 | Foss | B60H 1/008 73/117.01 |
| 6,758,739 | B1 * | 7/2004 | Sangwan | B60H 1/008 454/139 |
| 6,800,022 | B2 * | 10/2004 | Urbank | B60H 1/008 454/139 |
| 8,092,285 | B2 | 1/2012 | Mathur et al. | |
| 8,509,991 | B2 | 8/2013 | Bai | |
| 9,202,316 | B1 * | 12/2015 | Trudell | B60H 1/00978 |
| RE45,939 | E * | 3/2016 | Yelles | B60H 1/3208 |
| 9,688,194 | B2 * | 6/2017 | MacNeille | G05B 15/02 |
| 2005/0135966 | A1 * | 6/2005 | Niemann | G01N 33/004 422/62 |
| 2005/0192724 | A1 * | 9/2005 | Hendry | B60H 1/00735 701/36 |
| 2006/0064232 | A1 * | 3/2006 | Ampunan | B60T 7/16 701/115 |
| 2007/0243808 | A1 * | 10/2007 | Mathur | B60H 1/00764 454/75 |
| 2008/0283626 | A1 * | 11/2008 | Aldana | A61L 2/22 239/68 |
| 2009/0188267 | A1 * | 7/2009 | Dai | B60H 1/00735 62/239 |
| 2009/0326760 | A1 * | 12/2009 | Clark | B60H 1/00771 701/36 |
| 2011/0046846 | A1 * | 2/2011 | Prokhorov | B60H 1/008 701/36 |
| 2011/0246022 | A1 * | 10/2011 | Bai | B60H 1/00771 701/36 |
| 2012/0150353 | A1 * | 6/2012 | Bassa | B60H 1/00771 700/276 |
| 2012/0293315 | A1 | 11/2012 | Schunder et al. | |
| 2013/0260668 | A1 | 10/2013 | Stakutis et al. | |
| 2013/0267157 | A1 * | 10/2013 | Park | B60H 1/008 454/70 |
| 2014/0262132 | A1 * | 9/2014 | Connell | B60H 1/00457 165/11.1 |
| 2015/0032266 | A1 * | 1/2015 | Weast | B60H 1/008 700/276 |

OTHER PUBLICATIONS

"ACM Air Classification Module", AppliedSensor, accessed online Apr. 29, 2015, 2 pages.

"Automotive", AppliedSensor, accessed online Apr. 29, 2015, 2 pages.

* cited by examiner

AUTOMATIC VEHICLE CLIMATE CONTROL BASED ON PREDICTED AIR QUALITY

BACKGROUND

The present application relates generally to an improved data processing apparatus and method and more specifically to mechanisms for providing automatic vehicle climate control based on predicted air quality.

Air quality is increasingly an issue as populations increase, fossil fuel usage increases, and industrial capacity of countries increases. Air quality greatly affects the health and quality of life of individuals with regard to pollution levels but also with regard to naturally occurring particulates in the air, such as allergens and the like. Because of this, many governmental and private organizations monitor air quality so as provide regulations to try to manage the air quality as well as issue advisories to individuals to assist them in planning their activities and minimize exposure to areas where the air quality may cause issues with their health. For example, the National Oceanic and Atmospheric Administration (NOAA) has a National Weather Service (NWS) that utilizes models to forecast, among other things, the air quality for various areas of the United States of America.

SUMMARY

In one illustrative embodiment, a method is provided, in a data processing system of a vehicle comprising a processor and a memory, for controlling air quality within an interior of a vehicle. The method comprises receiving, by the data processing system, air quality data from a vehicle mounted sensor of the vehicle, and at least one of a sensor of another vehicle, an external environment sensor, or a remotely located information source system. The method also comprises determining, by the data processing system, a first air quality measure for an external environment exterior to the vehicle and a second air quality measure of an internal environment of the vehicle based on the air quality data. Moreover, the method comprises determining, by the data processing system, at least one control signal to send to a climate control system of the vehicle based on the determined first air quality measure and determined second air quality measure. Furthermore, the method comprises controlling, by the data processing system, air quality within the internal environment of the vehicle by sending the at least one control signal to the climate control system.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
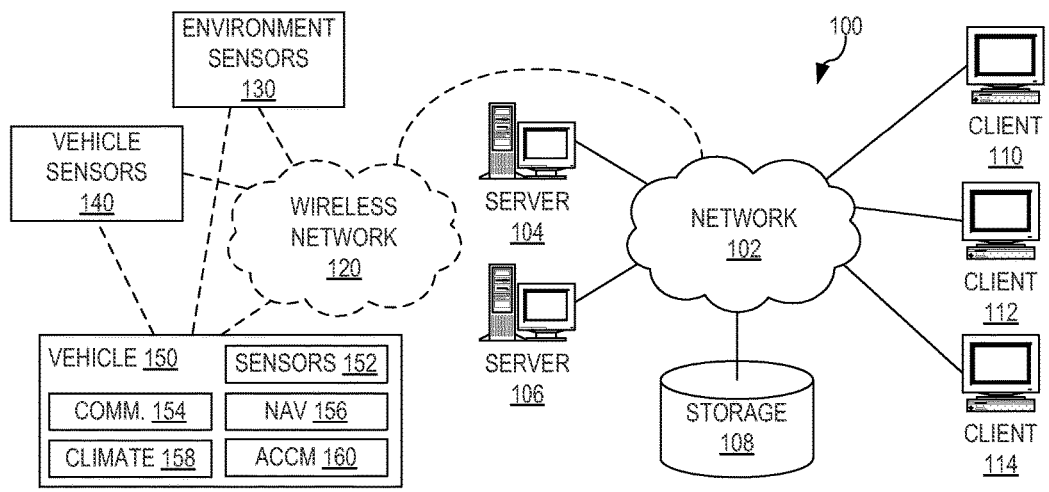
FIG. 1 is an example diagram of a distributed data processing system in which aspects of the illustrative embodiments may be implemented.

As mentioned above, air quality is increasingly an issue with regard to individual health and quality of life. This is especially true in situations where individuals are traveling from one area to another where the air quality may change rapidly and dramatically. For example, often when travelling in a vehicle, such as in stop-and-go or stalled traffic or on a major thoroughfare with large vehicles, such as large multi-axel trucks and the like, air quality can rapidly switch from good to heavily polluted and vice versa. This may be due to the exhaust of the vehicles themselves, may be due to geographical areas where industry is present and which also expel pollutants into the air, may be due to areas where allergens are largely generated by natural and man-made processes, or any of a number of other reasons. For example, a diesel truck accelerating can generate a large amount of smoke, idle cars at a traffic light or in stopped traffic can also affect air quality. On an environmental side, a variety of stationary causes can reduce air quality including, but not limited to, a controlled burning, various animals including skunks and the like, an industrial site, or the like.

Most modern vehicles have some type of climate control mechanism built into them that assists in making the interior of the vehicle comfortable for the passengers. For example, most wheeled vehicles have a heating, ventilating, and air conditioning (HVAC) system with manual controls that allow the passengers to adjust the temperature of the interior of the vehicle, fan speed, which vents in the vehicle are enabled for outputting the air from the HVAC system, whether the air flowing through the ventilation is re-circulated from the interior of the vehicle or brought in from the exterior of the vehicle, and the like. However, for the most part, these controls are manually set by the passenger and are not dependent upon any measure of air quality, where air quality refers to a measure of the presence of contaminants in the air, such as carbon monoxide, nitrogen dioxide, ozone, particulate matter, Sulphur dioxide, hydrogen sulfide, and the like.

Air quality may be measured and presented as particulate parts per million (PPM), an Air Quality Index (AQI), or any other suitable unit of measure indicative of how polluted the air is with contaminants. In general, an increase in the air quality indicates a relatively lower amount of contaminants and the air quality being "good," whereas a decrease in air quality indicates a relatively higher amount of contaminants and the air quality being "bad" or "worse."

Many types of air quality sensors exist for detecting air quality inside a home or building so as to modulate air systems to control the indoor air quality. Such air quality sensors focus on monitoring air quality of the affected zone (indoor air quality) rather than monitoring incoming or predicted air quality. That is, these air quality sensors that exist currently are basic detection sensors for stationary indoor zones, with no predictive or recovery capabilities. Predictive capabilities are those where, based on various information available to the sensor system, the air quality for a particular area may be predicted to be of a certain level, e.g., "good", "bad", particular AQI, or the like, and corresponding control of a climate control system may be initiated based on the prediction. Recovery capabilities are those where prediction capabilities are utilized to determine when air quality is likely to improve and thus, recovery of the air may be initiated from the region where air quality is predicted to be likely to be improved.

The illustrative embodiments provide mechanisms for performing climate control within an interior of a vehicle based on predictions of future air quality so as to maintain a comfortable and safe air quality within the vehicle. The mechanisms of the illustrative embodiments utilize various sources of information and combine this information in such a way as to obtain a prediction of a level of air quality of the current and future positions of the vehicle along a travel path of the vehicle, both with regard to internal air quality of the vehicle and exterior air quality of the vehicle, so as to compensate for deteriorating air quality internal/exterior to the vehicle. The mechanisms of the illustrative embodiments may automatically modify the settings of the climate control system of the vehicle so as to compensate for immediate temporary fluctuations in the air quality as well as air quality deteriorations that are predicted to be longer lasting.

At a high level, the mechanisms of the illustrative embodiments utilize various vision systems, vehicle mounted sensors, environmental sensors provided within the environment through which the vehicle is passing or is predicted to be passing at a future time, and data network based information sources to obtain the information used by the mechanisms of the illustrative embodiments to perform predictions of air quality both with regard to the current location of the vehicle and predicted future locations of the vehicle. Controlling the climate control system of the vehicle may be performed both with regard to air quality conditions/predictions associated with the current location of the vehicle as well as long term predicted air quality conditions at future locations as the vehicle travels, as described hereafter. Thus, the mechanisms of the illustrative embodiments may operate in a reactive manner such that if the current conditions of the vehicle indicate that the vehicle is presently in an area of poor air quality, the climate control system may be automatically controlled to modify its settings to maintain the internal air quality of the vehicle as high as possible. Moreover, the mechanisms of the illustrative embodiments may operate in a predictive manner so as to control the climate control system of the vehicle in a pre-emptive manner so as to prepare for entry into areas of relatively lower quality air, to thereby maintain the air quality within the vehicle as high as possible.

The illustrative embodiments operated to maximize air quality of the interior of the vehicle by improving the incoming rate of "good" quality air and minimizing the incoming rate of "bad" quality air. Again, the quality of the air is evaluated based on a level of contaminants such that "good" quality air has an amount of contaminants less than a predetermined threshold while "bad" quality air has an amount of contaminants equal to or greater than the predetermined threshold or another specified threshold. It should be appreciated that this evaluation may be made with regard to separate types of contaminants or measures of air quality such that each type of contaminant may be evaluated against its own set of one or more predetermined thresholds to determine air quality with regard to the particular contaminant. The aggregation of these evaluations may then be utilized to determine an overall air quality.

In general, the airflow should be reduced/switched to re-circulate when the quality of the air exterior to the vehicle is determined to be relatively bad. On the other hand, the airflow should be increased/switched to external intake when the quality of the air exterior to the vehicle is determined to be relatively good since, as air is re-circulated, the quality of the air gradually decreases as more contaminants are added to the air with each pass of the air through the same interior. Moreover, if the air quality external to the vehicle is determined to be relatively better than air quality within the interior of the vehicle, the climate control system of the vehicle may be automatically adjusted to increase the incoming airflow to increase the quality of the interior air. Furthermore, if, while in a re-circulate mode of operation, it is determined that the exterior air quality has improved, especially if the air quality is improved to better than the air quality within the interior of vehicle, the airflow from the exterior of the vehicle into the interior of the vehicle may be increased above a baseline to flush bad quality air from the interior.

In determining whether the air quality external to the vehicle is likely bad quality, various cameras, sensors, and information sources may be utilized. For example, vehicle mounted cameras may be utilized to take images and analyze portions of the image indicative of potentially bad quality air. Images in which dark clouds of smoke being expelled from exhaust of vehicles, images of smog-like haze over cities or on the horizon, indications of smoke that had previously been missing, and the like, may be indicative of exterior air quality conditions that are relatively poor. If a vehicle equipped with mechanisms of an illustrative embodiment is in traffic and images are captured indicating that a truck in front of the vehicle is expelling dark clouds of exhaust, for example, the illustrative embodiments may determine that the air quality external to the vehicle is relatively poor and thus, may initiate controls to change the operation of the climate control system to ensure that the air quality within the interior is maintained at as high a level as possible. This evaluation may also be based on other sensors associated with or mounted to the vehicle which are capable of measuring various characteristics of air quality both internal to the vehicle and external to the vehicle. These other sensors may be used alternative to the camera or in addition to the camera based mechanisms. In some cases, some of these sensors may not be attached to the current vehicle but may be road-side sensors, sensors on other vehicles that report to a centralized information source or otherwise broadcast their information to other vehicles via short-range wireless communication, or the like.

Moreover, in some illustrative embodiments, data may be obtained from various information sources, such as via wireless communication with a data network, to obtain data that has been determined to be pertinent to the evaluation of the air quality in the vehicle's current location. Such information sources may include any information source providing information regarding air quality reports, sensor data collected from vehicle mounted or road-side sensors reported to the information source, pollution map data, historical air quality data for the location, weather report information (humidity, temperature, and pollen counts, for example), and/or the like. Each portion of data/information may be obtained and evaluated, taking into account the relative weight of the information towards the determination of the air quality, as may be specified by one or more weighting factors, by calculating air quality scores for each element of the evaluation and weighting them according to appropriate weighting values to generate a score for the air quality. The score for the air quality may be compared against one or more threshold values to determine an appropriate control of the climate control system so as to maximize the air quality within the vehicle and maintain the air quality within the vehicle as high as possible. Scores may be generated for both the internal air quality and the external air quality so as to facilitate a comparison between the internal air quality and external air quality and provide for controlling the climate control system based on a difference in internal and external air quality, or predicted differences between internal and external air quality.

With regard to a prediction based operation, when the system predicts that the vehicle is entering or will be entering an area of decreased air quality external to the vehicle, operations may be performed to prepare for entry into the area of bad air quality such that the air quality within the vehicle is maximized before entry into the area of bad air quality. Moreover, operations may be performed to change the settings of the climate control system to avoid intake of bad quality air from external to the vehicle into the interior of the vehicle. For example, prior to predicted entry into the area of bad air quality, the climate control system may increase intake of air from the exterior of the vehicle in order to flush out any lower quality air within the interior of the vehicle and then transition to a re-circulate mode of operation. In this way, the air quality within the vehicle is maximized prior to entry into the bad air quality area, even perhaps maximized above the normal operating baseline, and is maintained as high a quality as possible by switching operation to re-circulate just prior to entry into the area of bad quality air.

These operations are based on predicted motion of the vehicle which may be determined from vehicle speed sensors, navigation systems, and the like, in comparison to the predicted location of the bad air quality so as to determine an approximate estimated time of arrival (ETA) into the bad air quality location. Moreover, information collected from other vehicles, as well as traffic information and the like, that may be available from an information source via wireless communication, may be used to determine an ETA for entry into the bad air quality location, e.g., average speed of vehicles along the route may be used to determine an estimated amount of time before entry into the bad air quality location.

If the operator of the vehicle has programmed a travel route into the navigation system of the vehicle, this programmed route may be used to predict locations of bad air quality that the vehicle will likely encounter if the vehicle maintains the programmed route. Furthermore, the mechanisms of the illustrative embodiments, in response to finding a bad air quality location or region being present along the programmed route, may automatically check alternate routes to determine if any alternate routes are available that would result in avoidance of bad air quality locations or regions, or at least minimize these and offer alternative routes to the operator. The operator may choose to utilize one of these alternate routes in which case the navigation system of the vehicle may be automatically updated to follow the newly selected route.

Similarly, prediction mechanisms may be utilized to predict how long the vehicle is likely to be in an area of bad air quality. That is, from the collected information for a geographical region around the vehicle or along a programmed route in the navigation system, the illustrative embodiments may identify areas of bad air quality. From the information used to calculate a speed of the vehicle or an expected average speed of the vehicle along the route, an estimate of how long the vehicle will likely be in the identified areas of bad air quality may be calculated. In response to determining how long the vehicle is estimated to be within an upcoming area of bad air quality, controls may be performed with the climate control system to prepare for the amount of time that the vehicle will be estimated to be within the area of bad air quality. For example, the amount of relatively good air flushed into the cabin, or the amount of improved air added to the cabin if an air improvement device is available, can depend on the length of time expected to spend in the area of bad air. If the vehicle is expected to spend an extended amount of time in the area of relatively bad air, normal air intake may resume anyway, especially for aspects such as temperature control, as the cabin air quality degrades to a point where it is no longer deemed more desirable than the external air.

In still a further illustrative embodiment, intelligent filtering of the airflow into the interior of the vehicle may be performed based on the above current and predictive determinations of exterior air quality. With the intelligent filtering system of the illustrative embodiments, the vehicle's HVAC system may be equipped with one or more air filters configured for filtering out particulates in the air, each filter potentially being optimized for different types and sizes of particulates. Different airflow channels may be required for each of the filters provided in the HVAC system with controllable air deflection mechanisms that may be used to deflect the airflow to a selected airflow channel to perform the corresponding filtering. For example, the data collected by the sensors, the information sources, and the like, and analyzed by the above described mechanisms may identify concentrations of different types of particulates within the air external to the vehicle. As a result, using configuration information maintained in the mechanisms of the illustrative embodiments that indicates which airflow channels are associated with which type of filter, the climate control system may be automatically controlled to cause corresponding airflow deflection mechanisms to direct the airflow to an airflow chamber having a filter for filtering out particulates having a relatively high concentration in the external air around the vehicle.

Hence, when the vehicle is in a region of good air quality, no filtering may be necessary and a corresponding airflow channel where no filter is present may be selected. This allows for the saving of energy costs since the air will flow more freely and reduces filter replacement costs since the filter is being less utilized. In response to detecting a concentration of a particular type of particulates in the air, or at least a prediction of such particulates being present in the air, equal to or above a threshold value amount, the mechanisms of the illustrative embodiments may automatically switch the airflow to an airflow channel have a stronger filter, or a filter especially designed for the predicted particulates, e.g., a filter for filtering out diesel fuel emissions if the mechanism predict such diesel fuel emissions to be present due to camera imaging identifying diesel trucks expelling black smoke. The filter itself may take many different forms depending upon the particular desired implementation. For example, the filter may be an in-line filter that operates passively to block the flow of particulates as air passes through the filter, the filter may be an electrostatic filter that is charged by vehicle power when deemed necessary with the charging being controlled by the mechanisms of the illustrative embodiments in response to the detection or prediction of the presence of particulates, or the like.

It should be appreciated that the controls of if and when to switch operating modes of the climate control system may be based on a relative comparison of the air quality of the interior of the vehicle, as determined by one or more vehicle mounted sensors that sense air quality data, e.g., presence of contaminants within the interior cabin of the vehicle, or predicted air quality of the interior of the vehicle, as may be generated by modeling a deteriorating condition of the air quality internal to the vehicle, to the air quality of the exterior of the vehicle or predicted air quality of the environment at a future location of the vehicle along a route. If the interior air quality is determined or predicted to be better than the air quality of the exterior, then for that location it may be determined that the climate control system should be placed in a re-circulate mode of operation. If the interior air quality is determined or predicted to be equal to or worse than the air quality of the exterior environment, then for that location it may be determined that the climate control system should be placed in an exterior intake mode of operation. Such determinations may be made for an entire route, or portion of a route, or predicted path of motion of the vehicle such that a schedule of control signals for sending to the climate control system may be generated and used to control the air quality within the interior of the vehicle to be a maximum quality achievable.

Thus, the illustrative embodiments provide mechanisms for controlling a vehicle's climate control system and corresponding HVAC system in response to detected and predicted air quality conditions external to the vehicle. The mechanisms of the illustrative embodiments may operate in areas where air quality changes rapidly (e.g. over seconds or minutes) and/or in situations where long-term predictions are utilized, such as in the case of programmed travel routes over longer distances. For example, consider a vehicle crossing a series of intersections in a city environment at regular intervals, where the air quality is significantly worse at the intersections due to the higher concentration of vehicles at the intersection, and in particular the idling vehicles at the intersection. The mechanisms of the illustrative embodiments may operate to flush the air within the vehicle while the vehicle is in an area of relatively good quality air, as determined from prediction of areas of good quality air using the mechanisms of the illustrative embodiments, i.e. between intersections, while setting the climate control system to a re-circulate mode of operation when approaching an intersection. This will result in an overall improvement of the air quality within the vehicle. Similar operations may be performed in a predictive manner for longer travel based on predicted air quality of regions of the future travel path of the vehicle.

Before beginning the discussion of the various aspects of the illustrative embodiments in more detail, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
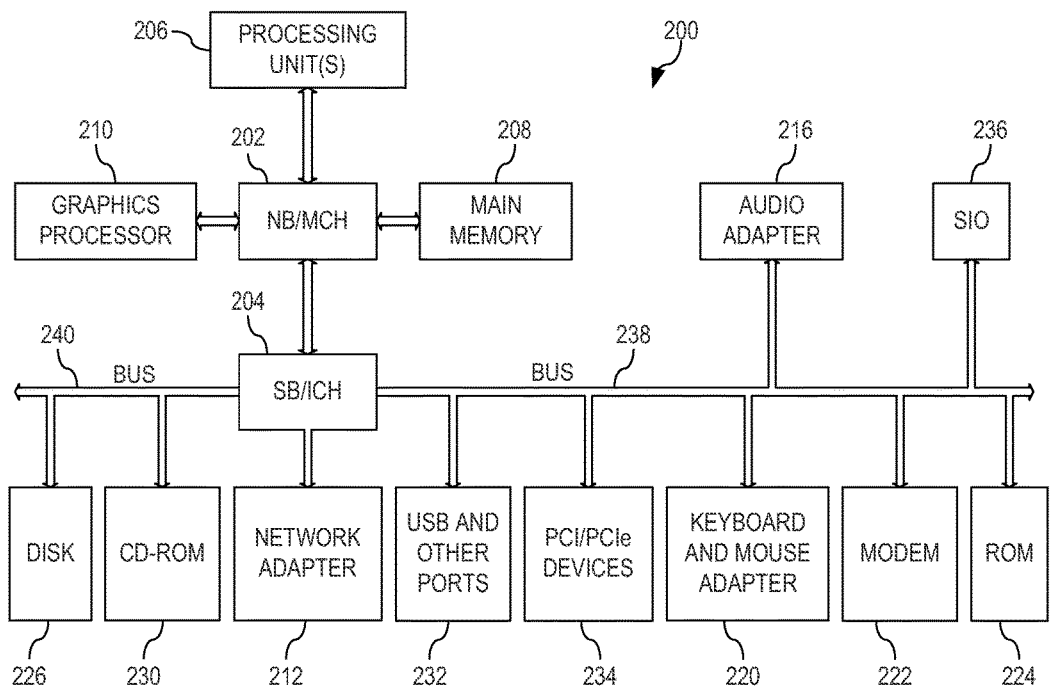
FIG. 2 is an example block diagram of a computing device in which aspects of the illustrative embodiments may be implemented.

The illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

As shown in FIG. 1, the network 102 may be coupled to a wireless network 120 which may comprise one or more wireless networks of various types including cellular networks, WiFi and Bluetooth networks or other short range wireless networks, satellite networks, or the like. The coupling of wired to wireless networks is generally known in the art and thus, a more detailed explanation is not provided herein. Essentially, data may be communicated to and from wireless devices via the wireless network 120 with data processing devices coupled to the data network 102, e.g., servers 104-16, storage 108, and clients 110-114. In particular to the present invention, the wireless network 120 operates to provide a communication pathway for a vehicle 150 to obtain information from environment sensors 130, other vehicles' sensors 140, and information available from data processing systems coupled to network 102 in order to facilitate a determination as to current and predicted air quality of the environment in which the vehicle 150 is traveling or will be traveling.

Figure 3:
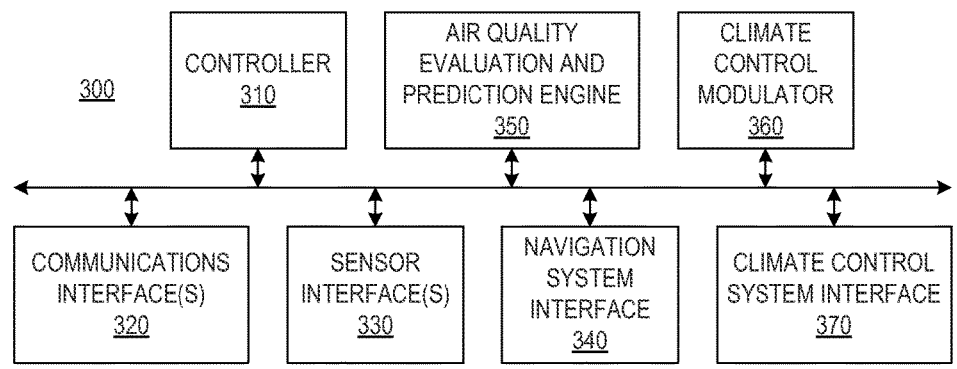
FIG. 3 is an example diagram illustrating the primary operational elements of an automated climate control modulation system of a vehicle in accordance with one illustrative embodiment.

As shown in FIG. 1, and discussed in greater detail hereafter with regard to FIG. 3, the vehicle 150 is equipped with one or more vehicle mounted sensors 152, one or more communication systems 154, a navigation system 156, a climate control and HVAC system 158, and an automated climate control modulation (ACCM) system 160. The one or more vehicle mounted sensors 152 provide data to the ACCM 160 for purposes of determining interior and exterior air quality associated with the vehicle 150. That is, sensors 152 may comprise sensors that measure the air quality within the interior cabin of the vehicle 150 as well as sensors that measure various aspects of the air quality surrounding the vehicle in an external environment. These sensors may be of various types as noted above including image capture devices (e.g., cameras), contaminant detection sensors, particulate detection sensors, and the like. Any known, or later developed, sensors for identifying the quality of air present in the interior or exterior of the vehicle may be used without departing from the spirit and scope of the illustrative embodiments.

The one or more communication systems 154 provide communications capability for exchanging data with other systems or devices including the wireless network 120, other nearby vehicles to obtain vehicle sensor 140 information from these other vehicles, environmental sensors 130, such as road-side sensors that transmit or broadcast sensor data, or the like. Essentially, any long range or short range wireless communication is facilitated by the communication systems 154 of the vehicle 150 including, but not limited to, cellular communication, satellite communication, WiFi or Bluetooth communication, or the like.

The navigation system 156 may be any generally known or later developed vehicle navigation system. Such navigation systems 156 generally include visual map capabilities using a map database, route searching and planning capabilities, various settings that are able to be set by the user to instruct the navigation system 156 in the preferences of the user for route searching and planning, guidance capabilities for guiding the user while operating the vehicle to assist in maintaining a previously defined route, and the like. Such navigation systems are prevalent in modern vehicles and thus, a more detailed description is not provided herein. However, it should be noted that with regard to the specific mechanisms of the illustrative embodiments, the navigation system 156 provides information to the mechanisms of the illustrative embodiments for purposes of predicting regions in which the vehicle will travel so that air quality along the route may be predicted.

The climate control system 158 comprises the computer controls and physical HVAC system components for controlling airflow into the interior cabin of the vehicle as well as any expelling of air from the internal cabin back into the outside environment. The climate control system 158 has controls for controlling the airflow through portions of the HVAC system including setting the system to a re-circulate mode of operation in which airflow from external to the vehicle is prevented or significantly reduced while air within the interior of the vehicle is re-circulated, setting the system to an external intake mode of operation in which air from outside the vehicle is allowed to flow into the interior of the vehicle, filtration modes of operation that redirects airflow through specific channels of the HVAC system in accordance with determinations as to whether filtering of the air should be performed, and the like.

The automatic climate control modulation (ACCM) system 160 comprises logic for analyzing sensor information obtained from vehicle mounted sensors 152 and sensors of other vehicles 140 and environment sensors 130, navigation system information from navigation system 156, and collected environmental information obtained from information sources via the networks 102, 120, and the like, to generate a representation of the air quality within the vehicle interior and currently around the vehicle, as well as interior and exterior air quality predicted to be along a route of travel of the vehicle. The ACCM 160 further comprises logic for determining control signals to send to the climate control system 158 to control operation of the HVAC system so as to maintain a high level of air quality within the interior cabin of the vehicle 150 along this route or predicted path of motion. In so doing, the ACCM 160 may determine proper controls for the HVAC system, e.g., whether the HVAC should be operating in re-circulate mode, external intake mode, filtration mode, or the like, as well as the timing of when to send control signals to the climate control system 158 to effectuate the changes in the setting of the HVAC system so as to maintain a highest possible quality air within the vehicle interior. The specific ways in which the ACCM 160 may operate in this manner, both in a reactive way based on current conditions of the vehicle, and in a predictive manner based on predicted motion or travel of the vehicle and estimated air quality conditions along the travel path or route of the vehicle, will be described in greater detail hereafter.

It should be noted that with the mechanisms of the illustrative embodiments, the ACCM 160 may utilize information obtained from remote information sources accessed via the wireless network 120 and the data network 102. These information sources ma comprise data processing systems or devices, such as, for example, servers 104 and 106, which provide information services from which environmental data may be obtained. For example, the server 104 may host a weather service that provides information to users of client devices 110-114 informing users of the current and forecasted weather conditions in various geographical areas. This information may include various air quality assessments for the geographical areas including amount of pollution present, allergens present, and the like. Moreover, server 106 may provide a traffic service that identifies traffic conditions along road-ways as well as information about traffic congestion, vehicle types, accident information, average speed information, and the like. Additional servers may provide additional information useable in determining air quality of geographical areas including servers that collect information from vehicle mounted sensors, servers that collect information from road-side sensors, or the like. These sensors may specify different types of environmental conditions directed to air quality including detected amounts of contaminants in the air, detected traffic speeds, and the like. These sources of information may generally be referred to herein as external environmental information sources since they are external to the vehicle 150 in question and provide information about the conditions of the environment in which the vehicle is traveling or is predicted to be traveling in the future.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System P® computer system, Power™ processor based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

It should be appreciated that while the data processing system 200 may be any of the servers 104, 106 or client computing devices 110-114 in FIG. 1, a similar data processing system 200 may also be used to implement one or more of the elements of the vehicle 150, such as ACCM system 160 either alone or in combination with one or more of the navigation system 156, the climate control system 158, communication system 154, and sensors 152, for example. That is, a vehicle computing system may be provided having components similar to that shown in FIG. 2 which may be used to implement the various analysis, prediction, and control functions once specifically configured to implement such functions. For example, in one illustrative embodiment, the processing units 206 may be programmed by instructions in main memory 208 to implement the functionality of elements 156-160 while the modem 222 and network adapter 212 (wireless communication adapter) may provide functionality for implement the communications system 154. Moreover, the USB and other ports 232, PCI/PCIe devices 234, and the like, may provide connectivity for vehicle mounted sensors 152, and the like. Thus, the data processing system of FIG. 2 may be used to implement the mechanisms of the illustrative embodiments as well as the external environment information sources.

As mentioned above, often when travelling in a vehicle, such as in stop-and-go or stalled traffic or on a major thoroughfare with large vehicles, such as large multi-axel trucks and the like, air quality can rapidly switch from good to heavily polluted and vice versa. Moreover, some geographic areas are known for their relatively bad or low air quality due to various factors including traffic congestion, industrial complexes, large populations, occasional events such as controlled burns, unique events, such as forest or brush fires, and the like. Thus, vehicles moving in or through such areas can expect to experience lower quality air conditions.

The illustrative embodiments provide mechanisms for performing climate control within an interior of a vehicle based on currently detected air quality conditions and predictions of future air quality so as to maintain a comfortable and safe air quality within the vehicle. The mechanisms of the illustrative embodiments utilize various sources of information and combine this information in such a way as to obtain a prediction of a level of air quality of the current and future positions of the vehicle along a travel path of the vehicle so as to compensate for deteriorating air quality exterior to the vehicle. The mechanisms of the illustrative embodiments may automatically modify the settings of the climate control system of the vehicle so as to compensate for immediate temporary fluctuations in the air quality as well as air quality deteriorations that are predicted to be longer lasting.

FIG. 3 is an example diagram illustrating the primary operational elements of an automated climate control modulation (ACCM) system 300, such as ACCM 160 in FIG. 1, of a vehicle, such as vehicle 150 in FIG. 1, in accordance with one illustrative embodiment. It should be appreciated that the elements 310-370 of the ACCM system 300 may be implemented as computer software instructions executed on hardware of one or more data processing systems, as specialized dedicated hardware elements comprising logic and circuitry for facilitating the functionalities attributed to the various elements 310-370, or any combination of software instructions executed by hardware and specialized dedicated hardware elements. For purposes of illustration, it will be assumed hereafter that the elements 310-370 are implemented as software instructions executing on hardware specifically configured to execute these software instructions so as to facilitate the performance of the functions of the illustrative embodiments attributed to the various elements 310-370.

As shown in FIG. 3, the ACCM system 300 includes a controller 310, a one or more communications interfaces 320, one or more sensor interfaces 330, a navigation system interface 340, an air quality evaluation and prediction engine 350, a climate control modulator 360, and a climate control system interface 370. It should be appreciated that other elements may also be provided in the ACCM system 300, such as memories, storage devices, and the like, to assist with the functionality of the depicted elements but are not included in FIG. 3 for clarity and focus on the functional elements of the system specific to the functions for performing air quality based automated climate control modulation.

The controller 310 controls the overall operation of the ACCM system 300 and orchestrates the operation of the other elements 320-370 as well as facilitates communication of data/control messages between the elements 320-370 via a bus or other communications pathway. Any operations or functionality described herein that is not attributed to a specific one of the other elements 320-370 may be implemented by the controller 310.

The communications interface(s) 320 provide data/control communication pathways for communicating with data processing systems, sensors, and other computing devices external to the vehicle. For example, communications interface(s) 320 may comprise the software, logic, circuitry, and other hardware elements needed to implement a cellular communication mechanism, a satellite communication mechanism, WiFi or Bluetooth communication system, or any other long or short range wireless communication system for communicating outside of the vehicle. Thus, the ACCM system 300 may receive data from sensors of other vehicles, environmental sensors, and external environment information sources and may similarly provide information to such devices via the communications interface(s) 320.

The sensor interface(s) 330 provide data communication pathways for communicating with various types of vehicle mounted sensors, such as sensors 152 in FIG. 1. These sensors may comprise image capture devices (e.g., still or video cameras), allergen detection sensors, contaminant detection sensors (see examples of contaminants previously provided above), and/or the like. The sensor interface(s) 330 comprise the protocols and logic for facilitating the communication with these sensors so as to obtain data useful to the ACCM system 300 for purposes of understanding the current air quality conditions of the vehicle both interior to the vehicle and exterior to the vehicle.

The navigation system interface 340 comprises logic for communicating with the vehicle's navigation system so as to obtain planned travel route information. The planned travel route information may be used to identify what geographical areas to investigate for purposes of determining air quality predictions. Moreover, the navigation system interface 340 provides the logic for facilitating communication with the vehicle navigation system for purposes of instructing the vehicle navigation system to generate alternative routes so as to avoid areas of bad air quality as discussed hereafter.

The air quality evaluation and prediction engine 350 receives, as input, the data received from the vehicle mounted sensors 152 via the sensor interface(s) 330, the data from other vehicle sensors 140, environment sensors 130, and external environment information sources obtained via the communications interface(s) 320. This data and information is analyzed with regard to a variety of air quality criteria, e.g., presence of contaminants, amount of particulates within the air, images from cameras indicative of smog, black smoke, and other environmental hazards, or the like. This analysis may be for the current location of the vehicle as well as future predicted locations of the vehicle. Moreover, this analysis may be performed for the external environment outside the vehicle as well as internal environment in the interior cabin of the vehicle. The results generated by the air quality evaluation and prediction engine 350 may comprise predicted air quality measures (internal and external) for both current and future positions of the vehicle and may be output to the climate control modulator 360.

The air quality results may comprise a calculated air quality score for the interior air of the vehicle cabin and exterior environment at a current location as well as a plurality of predicted locations of the vehicle along a specified predicted route of travel of the vehicle. The air quality scores may be calculated based on any suitable function of the various data collected from the sensors and external environment information sources. The function may utilize weights for weighting the contributions of the various sensor data and external environment information. For example, sensor data for vehicle mounted sensors may be given greater weight when calculating the air quality condition of the internal air of the interior cabin of the vehicle as well as the immediate surrounding environment of the vehicle. Similarly, historical air quality information, traffic information, and other vehicular sensor data may be given greater weight than the sensor data of the vehicle mounted sensors when calculating predicted air quality at future predicted locations of the vehicle. Moreover, historical data and current weather service data may be given greater weight for metropolitan areas as opposed to more rural areas. Any suitable weighting methodology may be used without departing from the spirit and scope of the illustrative embodiments.

The weights may be applied to quantifiable values or scores for various components of the air quality function corresponding to the components of air quality. For example, a scale of possible particulate levels in the air may be established such that numerical values may be assigned based on where along the scale the currently measured particulate count falls. This numerical value may be multiplied by a corresponding weight value to generate a score for the particular particulate component of the air quality function. This score may be accumulated with other scores for other components so as to generate an overall score for the air quality.

As mentioned previously, the evaluations that may be performed by the air quality evaluation and prediction engine 350 may comprise a prediction for predicting when the vehicle is likely to enter an area of bad quality air, a prediction for predicting when the vehicle is likely to exit an area of bad quality air, a prediction of how long the vehicle is expected to be traveling within an area of bad quality air, a prediction of when the vehicle will enter an area of good quality air, and the like. A series of such predictions may be made for various locations along a predicted future route of the vehicle, such as may be specified by the vehicle navigation system, for example. Similar predictions may be made for interior air quality as well based on a model of the air quality deterioration over time. Such a model may be based on numbers of passengers, air volume within the cabin of the vehicle, and other pertinent factors.

The climate control modulator 360 takes, as input, the results generated by the air quality evaluation and prediction engine 350 and calculates a schedule of control signals to be generated and output to the climate control system. For example, the climate control modulator 360 may determine that, based on the results generated by the air quality evaluation and prediction engine 350, the current location has bad air quality relative to the internal air quality and thus, the climate control modulator 360 may send instructions to the climate control system to modulate its settings to cause the climate control system to automatically change from an external intake mode of operation to a re-circulate mode of operation and/or a filtration mode of operation. Similarly, the climate control modulator 360 may determine that the vehicle is soon to be entering an area of bad quality air and may initiate a process of taking in good quality air and flushing out current interior air, such as by increasing fan speed or otherwise increasing the airflow from exterior of the vehicle into the interior of the vehicle, prior to entry into the bad quality air area. Just prior to entry into the bad quality air area, the climate control modulator 360 may send signals to the climate control system to cause the climate control system to switch from an external intake mode of operation to a re-circulate mode of operation.

The climate control system interface 370 provides logic for facilitating communication between the ACCM system 300 and the vehicle's climate control system so as to effect modifications in the operation of the vehicle's HVAC system to maximize the air quality of the interior of the vehicle. Through the climate control system interface 370, the ACCM system 300 may receive information about the current settings of the climate control system of the vehicle as well as send instructions to the climate control system so as to modulate the settings of the climate control system automatically and dynamically based on current and predicted air quality conditions both internal to the vehicle and external to the vehicle.

Thus, the mechanisms of the illustrative embodiments utilize various vision systems, vehicle mounted sensors, environmental sensors provided within the environment through which the vehicle is passing, or is predicted to be passing at a future time, and data network based information sources (external environment information sources) to obtain the information used by the mechanisms of the illustrative embodiments to perform predictions of air quality both with regard to the current location of the vehicle and predicted future locations of the vehicle. Controlling the climate control system of the vehicle may be performed both with regard to air quality conditions/predictions associated with the current location of the vehicle as well as long term predicted air quality conditions at future locations as the vehicle travels, as described hereafter. Thus, the mechanisms of the illustrative embodiments may operate in a reactive manner such that if the current conditions of the vehicle indicate that the vehicle is presently in an area of poor air quality, the climate control system may be automatically controlled to modify its settings to maintain the internal air quality of the vehicle as high as possible. Moreover, the mechanisms of the illustrative embodiments may operate in a predictive manner so as to control the climate control system of the vehicle in a pre-emptive manner so as to prepare for entry into areas of relatively lower quality air, to thereby maintain the air quality within the vehicle as high as possible.

The quality of the air is evaluated based on a level of contaminants. This evaluation may be made with regard to separate types of contaminants or measures of air quality such that each type of contaminant may be evaluated against its own set of one or more predetermined thresholds to determine air quality with regard to the particular contaminant. The aggregation of these evaluations, i.e. scores associated with the various contaminants or air quality indicators, may then be utilized to determine an overall air quality both for the interior and the exterior of the vehicle.

In general, the airflow produced by the HVAC system of the vehicle under control of a climate control system, is reduced/switched to re-circulate by the climate control modulator 360 when the quality of the air exterior to the vehicle is determined to be relatively bad by the air quality evaluation and prediction engine 350. On the other hand, the airflow is increased/switched to external intake mode by the climate control modulator 360 when the quality of the air exterior to the vehicle is determined to be relatively good by the air quality evaluation and prediction engine 350. Moreover, if the air quality external to the vehicle is determined, by the air quality evaluation and prediction engine 350, to be relatively better than air quality within the interior of the vehicle, the climate control system of the vehicle may be automatically modulated by the climate control modulator 360 to increase the incoming airflow from external to the vehicle to increase the quality of the interior air. Furthermore, if, while in a re-circulate mode of operation, it is determined by the air quality evaluation and prediction engine 350 that the exterior air quality has improved, especially if the air quality is improved to better than the air quality within the interior of vehicle, the airflow from the exterior of the vehicle into the interior of the vehicle may be increased above a baseline to flush bad quality air from the interior.

In determining whether the air quality external to the vehicle is likely bad quality, data from various cameras, sensors, and external environment information sources may be obtained via the interfaces 320 and 330 and utilized in performing current and future predictive calculations. For example, vehicle mounted cameras may be utilized to take images and analyze, by the air quality evaluation and prediction engine 350, portions of the image indicative of potentially bad quality air. Images in which dark clouds of smoke being expelled from exhaust of vehicles surrounding the current vehicle, images of smog-like haze over cities or on the horizon, and the like, may be indicative of exterior air quality conditions that are relatively poor. The presence of such images may be used to generate a corresponding score for this component of the air quality function evaluated by the air quality evaluation and prediction engine 350. If a vehicle equipped with mechanisms of an illustrative embodiment is in traffic and images are captured indicating that a truck in front of the vehicle is expelling dark clouds of exhaust, for example, the air quality evaluation and prediction engine 350 may utilize this information, along with other information obtained from carbon monoxide sensors, traffic information obtained from external environment information sources, road-side sensors, or the like, to calculate an air quality score or index representative of the quality of the air and determine that the air quality external to the vehicle is relatively poor. As a result, the climate control modulator 360 may initiate controls to change the operation of the climate control system, via the climate control system interface 370, to ensure that the air quality within the interior is maintained at as high a level as possible.

As mentioned above, the external environment information sources from which information may be obtained for use by the air quality evaluation and prediction engine 350 via the communications interfaces 320 may include any information source providing information regarding air quality reports, sensor data collected from vehicle mounted or road-side sensors reported to the information source, pollution map data, historical air quality data for the location, weather report information (humidity, temperature, and pollen counts, for example), and/or the like. Each portion of data/information may be obtained and evaluated, taking into account the relative weight of the information towards the determination of the air quality, as may be specified by one or more weighting factors, by calculating air quality scores for each element of the evaluation and weighting them according to appropriate weighting values to generate a score for the air quality. The score for the air quality may be compared against one or more threshold values to determine an appropriate control signal to be sent by the climate control modulator 360 to the climate control system so as to modulate the settings of the climate control system in an effort to maximize the air quality within the vehicle and maintain the air quality within the vehicle as high as possible.

With regard to predictive operations, when the air quality evaluation and prediction engine 350 predicts that the vehicle is entering or will be entering an area of decreased air quality external to the vehicle, operations may be performed to prepare for entry into the area of bad air quality such that the air quality within the vehicle is maximized before entry into the area of bad air quality. Moreover, operations may be performed by the climate control modulator 360 to change the settings of the climate control system to avoid intake of bad quality air from external to the vehicle into the interior of the vehicle. For example, prior to predicted entry into the area of bad air quality, as determined by the air quality evaluation and prediction engine 350, the climate control modulator 360 may send control signals to the climate control system to increase intake of air from the exterior of the vehicle in order to flush out any lower quality air within the interior of the vehicle and then transition to a re-circulate mode of operation. In this way, the air quality within the vehicle is maximized prior to entry into the bad air quality area and is maintained as high a quality as possible by switching operation to re-circulate.

As mentioned above, these operations are based on predicted motion of the vehicle which may be determined from vehicle speed sensors, navigation systems, and the like, in comparison to the predicted location of the bad air quality so as to determine an approximate estimated time of arrival (ETA) into the bad air quality location. Moreover, information collected from other vehicles, as well as traffic information and the like, that may be available from an external environment information source via wireless communication, may be used to determine an ETA for entry into the bad air quality location, e.g., average speed of vehicles along the route may be used to determine an estimated amount of time before entry into the bad air quality location.

If the operator of the vehicle has programmed a travel route into the navigation system of the vehicle, this programmed route may be accessed via the navigation system interface 340 and used to predict locations of bad air quality that the vehicle will likely encountered if the vehicle maintains the programmed route. Furthermore, the mechanisms of the illustrative embodiments, in response to finding a bad air quality location or region being present along the programmed route, may automatically check alternate routes to determine if any alternate routes are available that would result in avoidance of bad air quality locations or regions, or at least minimize these and offer alternative routes to the operator. The operator may choose to utilize one of these alternate routes in which case the navigation system of the vehicle may be automatically updated to follow the newly selected route.

Similarly, prediction mechanisms may be utilized to predict how long the vehicle is likely to be in an area of bad air quality. That is, from the collected information for a geographical region around the vehicle or along a programmed route in the navigation system, the air quality evaluation and prediction engine 350 may identify areas of bad air quality. From the information used to calculate a speed of the vehicle or an expected average speed of the vehicle along the route, an estimate of how long the vehicle will likely be in the identified areas of bad air quality may be calculated by the air quality evaluation and prediction engine 350. In response to determining how long the vehicle is estimated to be within an upcoming area of bad air quality, the climate control modulator 360 may send control signals to the climate control system to prepare for the amount of time that the vehicle will be estimated to be within the area of bad air quality, as previously mentioned above.

In addition, the air quality evaluation and prediction engine 350 may comprise logic for predicting the rate of degradation of the re-circulated air within the interior of the vehicle when the vehicle's climate control system has been set to a re-circulate mode of operation. This prediction of degradation of the interior air quality may be performed based on various factors including the number of passengers in the vehicle, as may be determined from seat sensors or manual entry by the vehicle operator, and the volume of air within the cabin of the vehicle, which may be provided, for example, as a configuration parameter for the air quality evaluation and prediction engine 350. Based on an average rate of breathing by the passengers, the number of passengers, and the volume of air within the cabin, an amount of oxygen consumption of the passengers and expelling of carbon dioxide per unit time may be calculated and used as a prediction as to a schedule of degradation of the interior air quality over a period of time that the climate control system is predicted to be in a re-circulate mode of operation. This schedule of degradation of the interior air quality may be compared against the predictions of exterior air quality to determine when the interior air quality is likely to become equal to or less than the air quality of the exterior air. Such predictions may be used to determine when and how much to flush interior air of the vehicle prior to entry into the area of bad air quality or even when it is desirable to switch the climate control system to external intake mode of operation even though the exterior air is still considered to be of bad quality. That is, even though the exterior air may be considered bad quality, if the interior air is of the same or worse air quality, it would be more beneficial to switch to external intake so as to maximize the overall air quality within the interior of the vehicle.

In still a further illustrative embodiment, intelligent filtering of the airflow into the interior of the vehicle may be performed based on control signals sent from the climate control modulator 360, in response to the current and predictive determinations of exterior air quality made by the air quality evaluation and prediction engine 350. With the intelligent filtering system of the illustrative embodiments, the vehicle's HVAC system may be equipped with one or more air filters configured for filtering out particulates in the air, each filter potentially being optimized for different types and sizes of particulates. Different airflow channels may be required for each of the filters provided in the HVAC system with controllable air deflection mechanisms that may be used to deflect the airflow to a selected airflow channel to perform the corresponding filtering. Alternatively, electrostatic filters may be utilized such that the filters may be turned on/off based on the application of electrical current to the electrostatic filters. Either by selecting particular airflow channels or by selectively enabling/disabling the electrostatic filters, a dynamic automatic filtration system is made possible by the mechanisms of the illustrative embodiments based on the current and/or predicted air quality conditions.

The data collected by the sensors, the information sources, and the like, and analyzed by the air quality evaluation and prediction engine 350 may identify concentrations of different types of particulates within the air external to the vehicle. As a result, using configuration information maintained in the air quality evaluation and prediction engine 350 that indicates which airflow channels are associated with which type of filter, the climate control modulator 360 may send control signals to the climate control system via the interface 370 to cause corresponding airflow deflection mechanisms to direct the airflow to an airflow chamber having a filter for filtering out particulates having a relatively high concentration in the external air around the vehicle or to alternatively enable electrical current to be provided to the electrostatic filter in the airflow channel.

Figure 4:
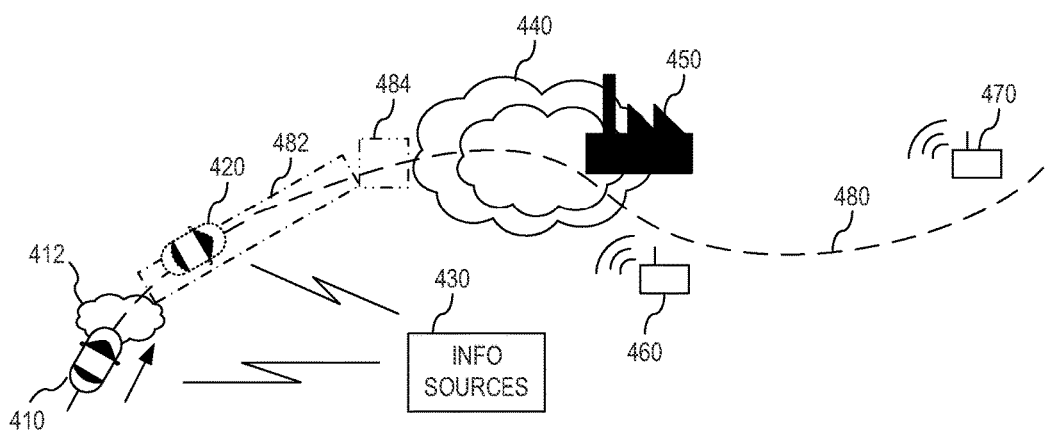
FIG. 4 is an example diagram illustrating a scenario for automated climate control of a vehicle based on predicted air quality in accordance with one illustrative embodiment.

FIG. 4 is an example diagram illustrating a scenario for automated climate control of a vehicle based on predicted air quality in accordance with one illustrative embodiment. As shown in FIG. 4, a vehicle 410 equipped with mechanisms in accordance with the illustrative embodiments may initially be traveling along a specified route 480, as may have been set using a vehicle navigation system. The vehicle 410 is currently in an area of bad quality air 412 as may be determined by vehicle mounted sensors on the vehicle 410, traffic and weather information obtained from external environment information sources 430, and/or the like. For example the vehicle 410 may have a camera that identifies images of black smoke being expelled from vehicles in close proximity to the current vehicle 410, may have carbon monoxide sensors indicating a build up of carbon monoxide in the immediate area, may receive traffic information from the information sources 450 indicating that the present location of the vehicle 410 has congested traffic conditions, and the like. As a result, the vehicle 410 may have its climate control system set to a re-circulate mode of operation such that the bad quality air is not brought into the interior of the vehicle 410.

The ACCM system of the vehicle 410 may receive additional information from the external environment information sources 430 indicating future air quality conditions along the route 480 so that the ACCM system may calculated scores of air quality and determine appropriate control signals to send to the climate control system of the vehicle 410 so as to maximize the quality of the air within the interior of the vehicle. For example, the external environment information sources 430 may relay information to the ACCM system based on sensor information from other vehicles 420 that has been received by the information sources 430 that is indicative of traffic conditions and air quality at a future location along the route 480. In the depicted example, vehicle 420 reports that the air quality improves in the region 482 such that the ACCM system may determine appropriate control signals to switch the climate control system to external intake mode of operation once the vehicle 410 enters the area 482. Moreover, the external environment information sources 430 may further indicate that, based on currently measured weather conditions, air conditions, and historical air condition information for the area 440, that the air quality in the area 440 due to its proximity to an industrial site 450, may be considered bad air quality. As a result, the ACCM system of the vehicle 410 may schedule appropriate control signals to be sent to the climate control system to cause an increase in external air intake in the region 484 just prior to the area 440 of bad air quality and then a switch to a re-circulate mode of operation just prior to entry into the region 440.

The information sources 430 may also relay information obtained from road-side environmental sensors 460 and 470 indicating the air quality conditions in regions of the route 480 after the area 440 where the quality of the air is determined to be bad. Based on this information, the ACCM system may determine appropriate control signals to cause the climate control system to switch between various modes of operation to maintain a highest possible air quality within the interior of the vehicle 410.

Figure 5:
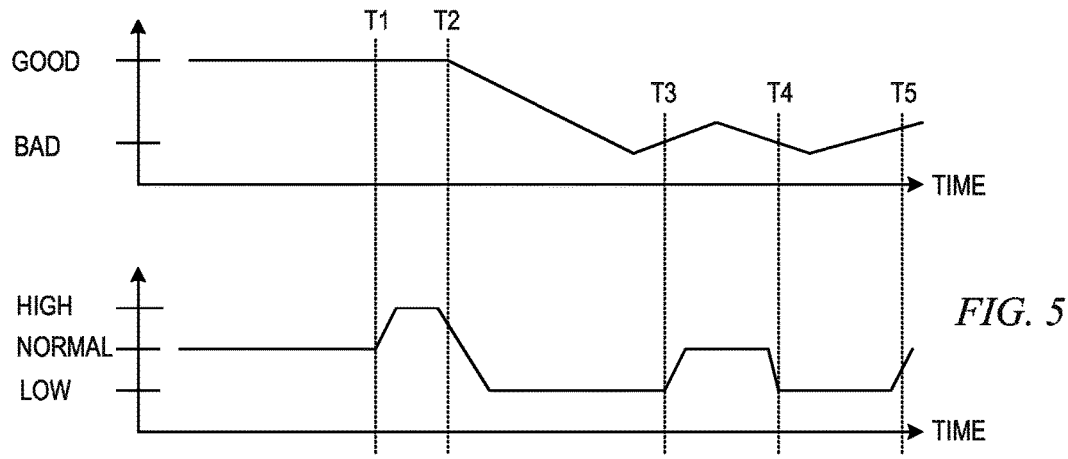
FIG. 5 is an example diagram illustrating plots of predicted air quality and modulated incoming airflow during travel in accordance with one illustrative embodiment.

FIG. 5 is an example diagram illustrating plots of predicted air quality and modulated incoming airflow during travel in accordance with one illustrative embodiment. As shown in FIG. 5, during a time period ranging from time T0 to time T1, the air quality is determined to be good and thus, the climate control system is set to a normal mode of operation. The ACCM system may determine that at a time T2, the vehicle will be entering an area of transition into a bad air quality area. As such, at time T1, the ACCM system may send a control signal to the climate control system to increase the intake of exterior air into the interior cabin of the vehicle, thereby increasing the operation of the climate control system to a high level. At time T2, the air quality external to the vehicle will start decreasing and thus, the ACCM system transitions the climate control system to a re-circulate or low external intake mode of operation and maintains this setting until time T3.

At time T3, it is determined that the air quality external to the vehicle has increased above the "bad" air quality level and thus, momentarily the ACCM system sends control signals to the climate control system to cause the climate control system to return to a normal mode of operation. At time T4, it is determined that the air quality has again decreased to the bad air quality level and thus, the external intake of air is reduced to a low level or to a re-circulate mode of operation of the climate control system. In view of the above, it can be seen that the ACCM mechanism of the illustrative embodiments provides for a dynamic and automatic adjustment of the operation of the climate control system based on detected and predicted air quality.

At time T5, it is determined that while the air quality external to the vehicle is still considered to be at a low air quality level, measurements or predictions of the interior air quality indicate that the air quality within the vehicle is equal to or less than the air quality external to the vehicle. In such a case, even though the external air quality is not in the "good" range, the climate control system may be returned to a normal mode of operation, e.g., an external intake mode of operation, so as to maximize the quality of the air internal to the vehicle. That is, if the quality of the air inside the vehicle is equal to or worse than the air quality external to the vehicle, it would be beneficial to take in air from the vehicle's exterior so as to maximize the overall air quality of the interior cabin of the vehicle.

Thus, the illustrative embodiments provide mechanisms for controlling a vehicle's climate control system and corresponding HVAC system in response to detected and predicted air quality conditions external to the vehicle. The mechanisms of the illustrative embodiments may operate in areas where air quality changes rapidly (e.g. over seconds or minutes) and/or in situations where long-term predictions are utilized, such as in the case of programmed travel routes over longer distances.

Figure 6:
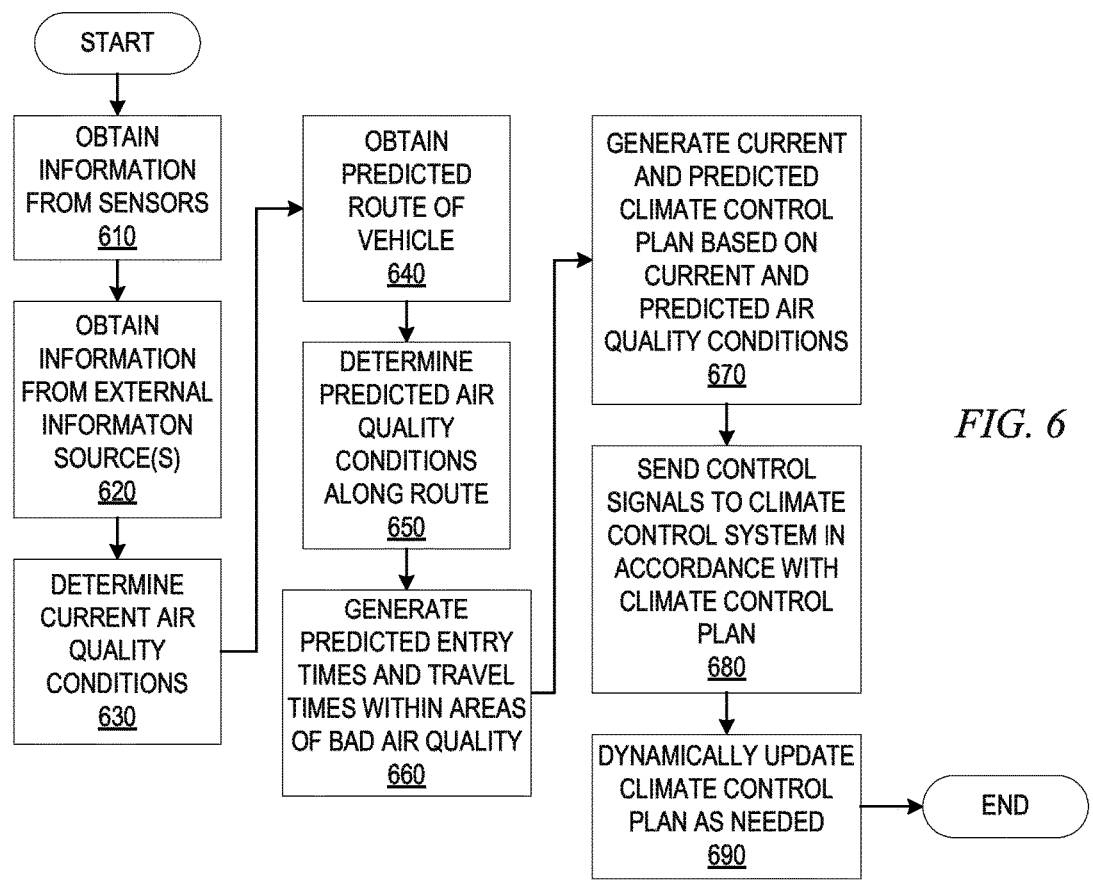
FIG. 6 is a flowchart outlining an example operation for automatically controlling a climate control system of a vehicle based on predicted air quality in accordance with one illustrative embodiment.

FIG. 6 is a flowchart outlining an example operation for automatically controlling a climate control system of a vehicle based on predicted air quality in accordance with one illustrative embodiment. As shown in FIG. 6, the operation starts by obtaining information from vehicle mounted sensors (step 610) and obtaining information from external environment information sources (step 620). The current air quality conditions both internal to the vehicle and external to the vehicle are determined (step 630).

The route that the vehicle is expected to traverse is obtained (step 640) and the predicted air quality conditions along the predicted route are determined (step 650). From this information, and information in the navigation system and from the external environment information sources indicating average speeds along the route, current speed of the vehicle, traffic conditions, and the like, calculations of the predicted entry and exit times, as well as expected amounts of time of travel within areas of bad air quality are generated (step 660). Based on all of this information, current and predicted climate control plans are generated (step 670). Control signals are then sent to the climate control system in accordance with these climate control plans (step 680).

The climate control plans may be dynamically updated as needed (step 680). That is, as information changes, the climate control plans may be updated. For example, if traffic conditions change along the route, traffic speeds, air quality indicators change, or the like, along the route, or at the current location of the vehicle, then the corresponding climate control plan may be updated accordingly to take into consideration these new conditions. Thus, the climate control plans may be updated continuously, periodically, or in response to events, such as reports of accidents along the route, reports of increased traffic conditions, and the like.

Thus, the illustrative embodiments provide dynamic automatic climate control based on current and predicted air quality conditions. While the illustrative embodiments are described as being applied to land-based wheeled vehicles, the illustrative embodiments are not limited to such. Rather, the illustrative embodiments may be utilized with any vehicle of any type including air vehicles, water craft, rail vehicles, and the like.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system of a vehicle comprising a processor and a memory, for controlling air quality within an interior of a vehicle, the method comprising:

receiving, by the data processing system, air quality data from a vehicle mounted sensor associated with the vehicle, and at least one of a sensor of another vehicle, an external environment sensor, or a remotely located information source system;

determining, by the data processing system, a first air quality measure for an external environment exterior to the vehicle and a second air quality measure of an internal environment of the vehicle based on the air quality data;

determining, by the data processing system, at least one control signal to send to a climate control system of the vehicle based on the determined first air quality measure and the determined second air quality measure; and controlling, by the data processing system, the air quality within the internal environment of the vehicle by sending the at least one control signal to the climate control system, wherein determining the first air quality measure comprises determining, for each of a plurality of types of pollutant, a concentration of the type of pollutant in air external to the vehicle based on the air quality data, and wherein controlling the air quality within the internal environment of the vehicle comprises controlling an intelligent filtering system of the vehicle to direct airflow through a selected filter, of a plurality of filters, of the intelligent filtering system, based on the determined concentrations of each of the types of pollutants in the air external to the vehicle, wherein the intelligent filtering system comprises a plurality of different types of filters, each being configured to filter out a different corresponding type of pollutant, and wherein directing the airflow through the selected filter comprises identifying, in configuration data of the intelligent filtering system, which airflow channel, of a plurality of airflow channels of the intelligent filtering system, comprises the selected filter, and controlling airflow deflectors of the intelligent filtering system to direct the airflow to the identified airflow channel comprising the selected filter.

2. The method of claim 1, wherein determining the first air quality measure for the external environment comprises generating a prediction of air quality of the external environment in a physical area through which the vehicle is predicted to travel at a future time, and wherein determining the at least one control signal to send to the climate control comprises determining a timing of the at least one control signal, the timing being prior to the vehicle entering the physical area, based on the prediction of air quality of the external environment in the physical area through which the vehicle is predicted to travel at the future time.

3. The method of claim 2, wherein determining the timing of the at least one control signal comprises determining a first time prior to a predicted entry time of the vehicle into the physical area at which to send a first control signal to the climate control system to transition the climate control system from a first mode of operation to a second mode of operation, different from the first mode of operation, and determining a second time, after the predicted entry time of the vehicle into the physical area, at which to send a second control signal to the climate control system to transition the climate control system from the second mode of operation back to the first mode of operation.

4. The method of claim 3, wherein the first time is determined based on a predicted amount of time that the vehicle is expected to be traveling within the physical area, wherein the first time is set to provide an amount of time prior to entry into the physical area by the vehicle, to increase an air quality of the interior of the vehicle above a nominal air quality of the interior of the vehicle prior to entry of the vehicle into the physical area.

5. The method of claim 2, further comprising:
determining one or more alternative routes of travel for the vehicle to avoid the physical area; and
presenting an output, via a vehicle mounted output device, identifying the one or more alternative routes of travel.

6. The method of claim 1, wherein controlling the intelligent filtering system of the vehicle further comprises sending the at least one control signal to the intelligent filtering system to enable an electrostatic filter of an airflow channel and control at least one air deflection mechanism to redirect airflow to the airflow channel having the enabled electrostatic filter.

7. The method of claim 1, wherein determining the at least one control signal comprises determining the at least one control signal based on a difference between the first air quality measure and the second air quality measure.

8. The method of claim 1, wherein the at least one control signal comprises at least one of a first control signal to cause the climate control system of the vehicle to switch to an external intake mode of operation in which air is circulated from the external environment, or a second control signal to cause the climate control system of the vehicle to switch to an internal re-circulate mode of operation in which air is re-circulated from within the internal environment of the vehicle.

9. The method of claim 1, wherein determining the at least one control signal to send to the climate control system of the vehicle based on the determined air quality measure comprises determining a schedule of a plurality of future times at which to send corresponding control signals to the climate control system corresponding to a plurality of navigation points along a predicted future route of the vehicle, based on predicted external environment air quality at the plurality of navigation points along the predicted future route of the vehicle.

10. The method of claim 1, wherein:
the air quality data comprises second air quality data received via a vehicle mounted camera,
the second air quality data comprises image data captured by the camera of the external environment in at least one direction from the vehicle, and
determining the first air quality measure for the external environment or the internal environment of the vehicle based on the air quality data comprises analyzing the image data to identify at least one of exhaust from a nearby vehicle, smog or smoke present within the external environment, or pollution present along a horizon of the images.

11. The method of claim 1, wherein determining, for each of the plurality of types of pollutants, the concentration of the type of pollutant in the air external to the vehicle based on the air quality data further comprises determining, for each type of pollutant, whether a corresponding concentration of the type of pollutant in the air external to the vehicle is equal to or greater than a corresponding threshold value for the particular type of pollutant, and wherein controlling the intelligent filtering system of the vehicle further comprises controlling the intelligent filtering system of the vehicle to direct airflow through the selected filter in response to the concentration of the type of pollutant being equal to or greater than the corresponding threshold.

12. The method of claim 1, wherein controlling the intelligent filtering system of the vehicle further comprises identifying, in the configuration data of the intelligent filtering system, which filter of the plurality of different types of filters is configured to filter out a pollutant that is selected to be filtered out based on the concentrations of the types of pollutants, and directing airflow through the identified filter.

13. The method of claim 1, wherein the selected filter is a filter for filtering out a type of pollutant having a high concentration relative to the other concentrations of the plurality of types of pollutants, wherein controlling air quality within the internal environment of the vehicle comprises controlling an intelligent filtering system of the vehicle to direct airflow through a selected airflow channel of the intelligent filtering system that comprises the selected filter, and wherein the intelligent filtering system comprises a plurality of airflow channels, each airflow channel in the plurality of airflow channels being associated with a different type of filter for filtering out a different type of pollutant.

14. A computer program product comprising a non-transitory computer readable medium having a computer readable program stored therein, wherein the computer readable program, when executed on a computing device, causes the computing device to: receive air quality data from a vehicle mounted sensor associated with the vehicle, and at least one of a sensor of another vehicle, an external environment sensor, or a remotely located information source system; determine a first air quality measure for an external environment exterior to the vehicle and a second air quality measure of an internal environment of the vehicle based on the air quality data; determine at least one control signal to send to a climate control system of the vehicle based on the determined first air quality measure and determined second air quality measure; and control air quality within the internal environment of the vehicle by sending the at least one control signal to the climate control system, wherein the computer readable program causes the computing device to determine the first air quality measure at least by determining, for each of a plurality of types of pollutants, a concentration of the type of pollutant in air external to the vehicle based on the air quality data, and wherein the computer readable program further cause the computing device to control the air quality within the internal environment of the vehicle at least by controlling an intelligent filtering system of the vehicle to direct airflow through a selected filter, of a plurality of filters, of the intelligent filtering system, based on the determined concentrations of each of the types of pollutants in the air external to the vehicle, wherein the intelligent filtering system comprises a plurality of different types of filters, each being configured to filter out a different corresponding type of pollutant, and wherein directing the airflow through the selected filter comprises identifying, in configuration data of the intelligent filtering system, which airflow channel, of a plurality of airflow channels of the intelligent filtering system, comprises the selected filter, and controlling airflow deflectors of the intelligent filtering system to direct the airflow to the identified airflow channel comprising the selected filter.

15. The computer program product of claim 14, wherein the computer readable program causes the computing device to determine the first air quality measure for the external environment at least by generating a prediction of air quality of the external environment in a physical area through which the vehicle is predicted to travel at a future time, and wherein the computer readable program causes the computing device to determine the at least one control signal to send to the climate control at least by determining a timing of the at least one control signal, the timing being prior to the vehicle entering the physical area, based on the prediction of air quality of the external environment in the physical area through which the vehicle is predicted to travel at the future time.

16. The computer program product of claim 15, wherein the computer readable program causes the computing device to determine a the timing of the at least one control signal at least by determining a first time prior to a predicted entry time of the vehicle into the physical area at which to send a first control signal to the climate control system to transition the climate control system from a first mode of operation to a second mode of operation, different from the first mode of operation, and determining a second time, after the predicted entry time of the vehicle into the physical area, at which to send a second control signal to the climate control system to transition the climate control system from the second mode of operation back to the first mode of operation.

17. The computer program product of claim 16, wherein the first time is determined based on a predicted amount of time that the vehicle is expected to be traveling within the physical area, wherein the first time is set to provide an amount of time prior to entry into the physical area by the vehicle, to increase an air quality of the interior of the vehicle above a nominal air quality of the interior of the vehicle prior to entry of the vehicle into the physical area.

18. The computer program product of claim 14, wherein the computer readable program causes the computing device to determine the at least one control signal at least by determining the at least one control signal based on a difference between the first air quality measure and the second air quality measure.

19. The computer program product of claim 14, wherein the computer readable program causes the computing device to determine the at least one control signal to send to the climate control system of the vehicle based on the determined air quality measure at least by determining a schedule of a plurality of future times at which to send corresponding control signals to the climate control system corresponding to a plurality of navigation points along a predicted future route of the vehicle, based on predicted external environment air quality at the plurality of navigation points along the predicted future route of the vehicle.

20. The computer program product of claim 14, wherein controlling the intelligent filtering system of the vehicle further comprises sending the at least one control signal to the intelligent filtering system to enable an electrostatic filter of an airflow channel and control at least one air deflection mechanism to redirect airflow to the airflow channel having the enabled electrostatic filter.

21. An apparatus comprising: a computing device comprising a processor and a memory configured to implement an automatic climate control modulation (ACCM) system; and a climate control system, wherein the ACCM system is configured to: receive air quality data from a vehicle mounted sensor associated with the vehicle, and at least one of a sensor of another vehicle, an external environment sensor, or a remotely located information source system; determine a first air quality measure for an external environment exterior to the vehicle and a second air quality measure of an internal environment of the vehicle based on the air quality data; determine at least one control signal to send to the climate control system of the vehicle based on the determined first air quality measure and determined second air quality measure; and control air quality within the internal environment of the vehicle by sending the at least one control signal to the climate control system, wherein the ACCM system determines the first air quality measure at least by determining, for each of a plurality of types of pollutants, a concentration of the type of pollutant in air external to the vehicle based on the air quality data, and wherein the ACCM system controls the air quality within the internal environment of the vehicle at least by controlling an intelligent filtering system of the vehicle to direct airflow through a selected filter, of a plurality of filters, of the intelligent filtering system, based on the determined concentrations of each of the types of pollutants in the air external to the vehicle, wherein the intelligent filtering system comprises a plurality of different types of filters, each being configured to filter out a different corresponding type of pollutant, and wherein directing the airflow through the selected filter comprises identifying, in configuration data of the intelligent filtering system, which airflow channel, of a plurality of airflow channels of the intelligent filtering system, comprises the selected filter, and controlling airflow deflectors of the intelligent filtering system to direct the airflow to the identified airflow channel comprising the selected filter.

* * * * *